(12) United States Patent
Kim et al.

(10) Patent No.: US 8,704,786 B2
(45) Date of Patent: Apr. 22, 2014

(54) DISPLAY APPARATUS

(75) Inventors: Sun-Mi Kim, Seongnam-si (KR); Sun-Kyu Joo, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 620 days.

(21) Appl. No.: 13/044,279

(22) Filed: Mar. 9, 2011

(65) Prior Publication Data

US 2012/0098799 A1 Apr. 26, 2012

(30) Foreign Application Priority Data

Oct. 22, 2010 (KR) .................. 10-2010-0103534

(51) Int. Cl.
*G06F 3/041* (2006.01)

(52) U.S. Cl.
USPC .......................... 345/173; 349/155

(58) Field of Classification Search
None
See application file for complete search history.

(56) References Cited

U.S. PATENT DOCUMENTS

| 6,630,977 | B1 | 10/2003 | Yamazaki et al. |
| 7,843,517 | B2 * | 11/2010 | Hsieh et al. .................. 349/12 |
| 2004/0141128 | A1 | 7/2004 | Kim et al. |
| 2004/0150782 | A1 | 8/2004 | Honda et al. |
| 2004/0169643 | A1 * | 9/2004 | Tseng ........................... 345/173 |
| 2005/0117094 | A1 | 6/2005 | Kim et al. |
| 2005/0206812 | A1 | 9/2005 | Tsubata |
| 2006/0061711 | A1 | 3/2006 | Lee et al. |
| 2006/0267914 | A1 | 11/2006 | Chang et al. |
| 2007/0263162 | A1 | 11/2007 | Kang et al. |
| 2008/0291382 | A1 | 11/2008 | Fukuoka et al. |
| 2009/0268131 | A1 * | 10/2009 | Tsai et al. ...................... 349/106 |
| 2009/0278810 | A1 * | 11/2009 | Ma et al. ........................ 345/173 |

FOREIGN PATENT DOCUMENTS

| JP | 2008-003552 | 1/2008 |
| KR | 1020080011563 | 2/2008 |
| KR | 1020080042338 | 5/2008 |

* cited by examiner

*Primary Examiner* — Jason Olson
(74) *Attorney, Agent, or Firm* — H.C. Park & Associates, PLC

(57) ABSTRACT

A display apparatus includes a first substrate, a second substrate with a liquid crystal layer disposed between the first and second substrates, a first spacer, and a second spacer. The first substrate includes a display area and a peripheral area. The first spacer is arranged in the peripheral area to maintain a distance between the first and second substrates, and the second spacer is arranged in the display area. A driving circuit includes a first signal line, a second signal line insulated from the first signal line, a protective layer, and a bridge electrode. The protective layer has a first contact hole exposing a portion of the first and second signal lines. The peripheral area includes a contact area corresponding to the first contact hole and a non-contact area proximal to the contact area. The first spacer is disposed in the non-contact area.

22 Claims, 6 Drawing Sheets

DISPLAY APPARATUS

CROSS REFERENCE TO RELATED APPLICATION

This application claims priority from and the benefit of Korean Patent Application No. 10-2010-0103534, filed on Oct. 22, 2010, which is hereby incorporated by reference for all purposes as if fully set forth herein.

BACKGROUND OF THE INVENTION

1. Field of the Invention

Exemplary embodiments of the present invention relate to a display apparatus. More particularly, exemplary embodiments of the present invention relate to a display apparatus that can prevent a malfunction thereof.

2. Discussion of the Background

In general, a display apparatus may include a display panel, a gate driver, and a data driver. The display panel may include a first substrate, a second substrate facing the first substrate, and a liquid crystal layer disposed between the first substrate and the second substrate. The first substrate may include a gate line, a data line, a switching device, and a pixel electrode. The second substrate may include a black matrix and a common electrode. The gate driver may output a gate signal to the gate line, and the data driver may output a data signal to the data line.

A gate IC-less structure in which the gate driver is directly formed in the display panel may reduce the size and increase the efficiency of the display apparatus.

In the gate IC-less structure, a parasitic capacitance may occur between the gate driver and the common electrode, which may cause a malfunction in the gate driver.

SUMMARY OF THE INVENTION

Exemplary embodiments of the present invention provide a display apparatus capable of preventing a malfunction thereof.

Exemplary embodiments of the present invention also provide a display apparatus that may have a reduced parasitic capacitance to prevent the display apparatus from malfunctioning.

Additional features of the invention will be set forth in the description which follows, and in part will be apparent from the description, or may be learned by practice of the invention.

An exemplary embodiment of the present invention discloses a display apparatus that comprises a first substrate. The first substrate comprises a display area comprising a plurality of pixels to display an image and a peripheral area comprising a driving circuit to drive the pixels. The display apparatus also comprises a second substrate facing the first substrate; a liquid crystal layer disposed between the first substrate and the second substrate; a first spacer disposed corresponding to the peripheral area to maintain a distance between the first substrate and the second substrate; and a second spacer disposed corresponding to the display area to maintain the distance between the first substrate and the second substrate. The driving circuit comprises a first signal line; second signal line insulated from the first signal line; a first protective layer disposed on the first signal line and the second signal line and comprising a first contact hole to expose a portion of each of the first signal line and the second signal line; and a bridge electrode disposed on the first protective layer to connect the first signal line and the second signal line through the first contact hole. The peripheral area further comprises a contact area corresponding to where the first contact hole is disposed and a non-contact area corresponding to where the first spacer is disposed.

An exemplary embodiment of the present invention also discloses a display apparatus that comprises a first substrate that comprises a display area comprising a plurality of pixels and a peripheral area comprising a driving circuit to drive the pixels. The display apparatus also comprises a second substrate facing the first substrate; a common electrode disposed on the second substrate; a liquid crystal layer disposed between the first substrate and the second substrate; a protective layer disposed on the first substrate; a first spacer arranged in the peripheral area to maintain a distance between the first substrate and the second substrate; and a second spacer arranged in the display area to maintain the distance between the first substrate and the second substrate. The peripheral area further comprises a non-contact area corresponding to the first spacer and a contact area, a height of the first spacer is less than a height of the second spacer. The distance from the protective layer to the common electrode corresponding to the contact area is greater than the distance from the protective layer to the common electrode corresponding to the non-contact area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
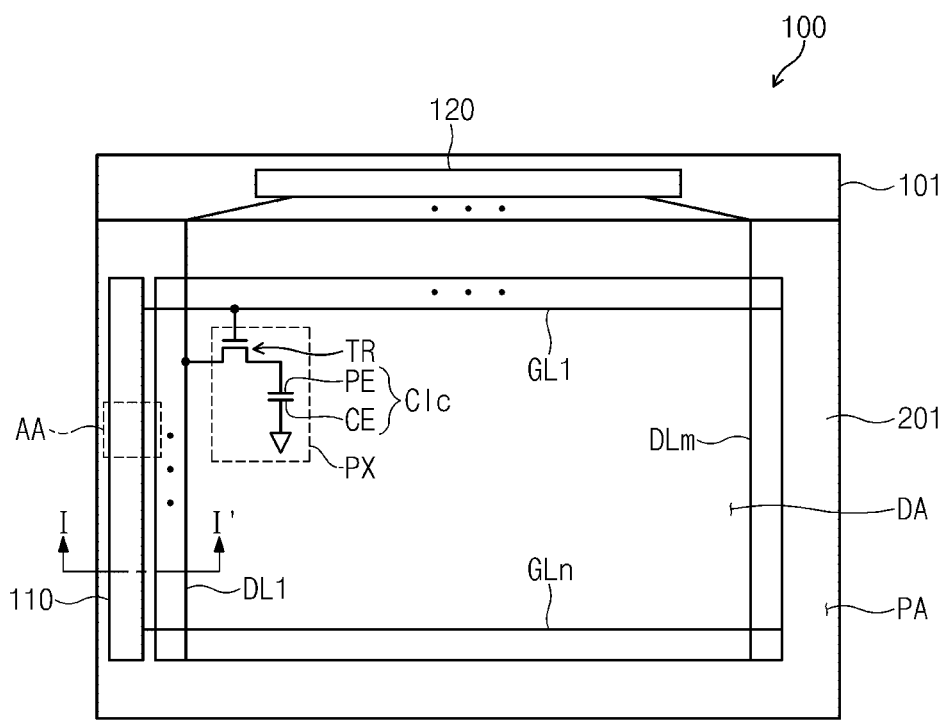
FIG. 1 is a plan view of a display apparatus according to exemplary embodiments of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, directly connected to, or directly coupled to the other element or layer, or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a plan view of a display apparatus according to exemplary embodiments of the present invention.

Referring to FIG. 1, a display apparatus 100 includes a first substrate 101, a second substrate 201 facing the first substrate 101, and a liquid crystal layer (not shown) disposed between the first and second substrates 101 and 201.

The first substrate 101 includes a plurality of pixels PX. The first substrate 101 includes a display area DA where an image is displayed and a peripheral area PA where an image is not displayed. The pixels PX are arranged in the display area DA to display the image.

In addition, the first substrate 101 includes a plurality of gate lines GL1 to GLn, a plurality of data lines DL1 to DLm, a plurality of thin film transistors TR, and a plurality of pixel electrodes PE. In the present exemplary embodiment, "n" and "m" are natural numbers greater than 1. Each pixel PX includes a corresponding gate line of the gate lines GL1 to GLn, a corresponding data line of the data lines DL1 to DLm, a corresponding thin film transistor of the thin film transistors TR, and a corresponding pixel electrode of the pixel electrodes PE. In addition, since the pixels PX have the same structure and function, for the convenience of explanation, one pixel has been shown in FIG. 1 as a representative example.

The gate lines GL1 to GLn, the data lines DL1 to DLm, the thin film transistor TR, and the pixel electrode PE are formed on a first base substrate in the display area DA through a thin film process. The gate lines GL1 to GLn are insulated from the data lines DL1 to DLm and cross the data lines DL1 to DLm.

The thin film transistor TR includes a gate electrode connected to a corresponding gate line of the gate lines GL1 to GLn, a source electrode connected to a corresponding data line of the data lines DL1 to DLm, and a drain electrode connected to the pixel electrode PE. The pixel electrode PE faces a common electrode CE disposed on the second substrate, and a liquid crystal layer is arranged between the pixel electrode PE and the common electrode CE to form a liquid crystal capacitor Clc. In some exemplary embodiments, the common electrode CE may be disposed on the first substrate 101.

In addition, the first substrate 101 includes a gate driver 110 disposed thereon to sequentially provide a gate signal to the gate lines GL1 to GLn. The gate driver 110 may be formed through a thin film process on the first base substrate in the peripheral area PA positioned at the left side of the display area DA.

In FIG. 1, the gate driver 110 has been positioned at the left side of the display area DA but the gate driver's 110 position is not limited thereto. That is, the gate driver 110 may be positioned at the right side of the display area DA or at both sides of the display area DA.

In addition, a chip containing a data driver 120 may be mounted on the first base substrate corresponding to the peripheral area PA at an upper portion of the display area DA. The chip is electrically connected to the data lines DL1 to DLm to provide a data signal to the data lines DL1 to DLm. In some exemplary embodiments, the data driver 120 may be positioned outside the first and second substrates 101 and 201.

Although not shown in FIG. 1, a timing controller (not shown) may be positioned outside the first and second substrates 101 and 201, may convert a data format of an image signal provided from an external signal source (not shown) into a data format appropriate to an interface between the data driver 120 and the timing controller, and may output the converted image signal to the data driver 120. In addition, the timing controller may apply a data control signal to the data driver 120 and may apply a gate control signal to the gate driver 110.

The gate driver 110 sequentially applies the gate signal to the gate lines GL1 to GLn in response to the gate control signal to sequentially scan the gate lines GL1 to GLn.

The data driver 120 generates a plurality of gray scale voltages using gamma voltages provided from a gamma voltage generator (not shown). The data driver 120 selects gray scale voltages corresponding to the image signal in response to the data control signal provided from the timing controller and respectively applies the selected gray scale voltages to the data lines DL1 to DLm as the data signal.

Figure 2:
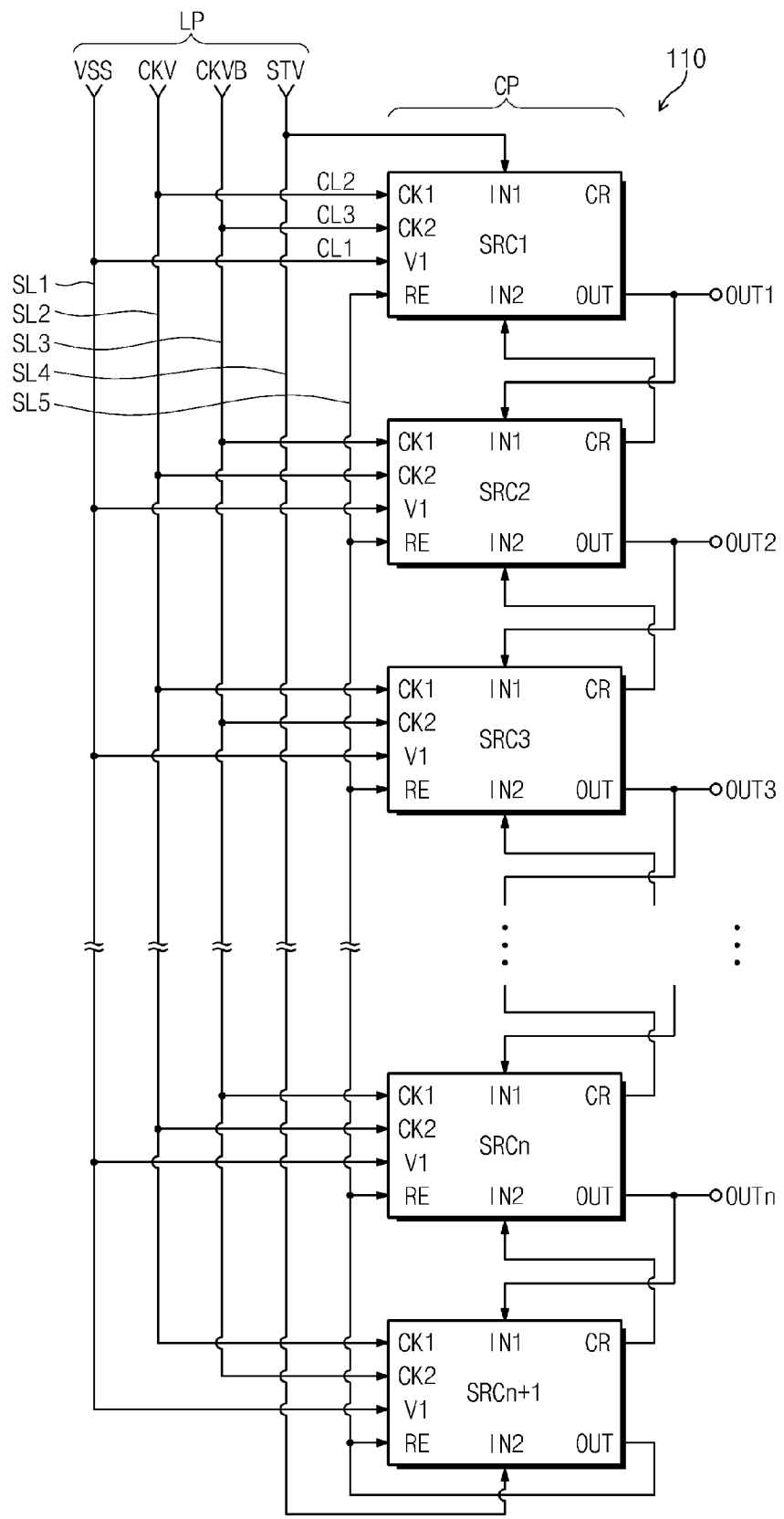
FIG. 2 is a block diagram of the gate driver of FIG. 1 according to exemplary embodiments of the present invention.

FIG. 2 is a block diagram showing a gate driver of FIG. 1.

Referring to FIG. 2, the gate driver 110 includes a circuit part CP and a line part LP positioned adjacent to the circuit part CP.

The circuit part CP includes first to (n+1)-th stages SRC1 to SRCn+1 connected to each other one after another, and the first to (n+1)-th stages SRC1 to SRCn+1 sequentially output first to n-th gate signals OUT1 to OUTn, respectively.

Each of the first to (n+1)-th stages includes a first clock terminal CK1, a second clock terminal CK2, a first input terminal IN1, a second input terminal IN2, an off voltage terminal V1, a reset terminal RE, a carry terminal CR, and an output terminal OUT.

Odd-numbered stages SRC1, SRC3, ..., SRCn+1 among the first to (n+1)-th stages SRC1 to SRCn+1 receive a first clock signal CKV through the first clock terminal CK1, and even-numbered stages SRC2, ..., SRCn among the first to (n+1)-th stages SRC1 to SRCn+1 receive a second clock signal CKVB through the first clock terminal CK1. Additionally, the odd-numbered stages SRC1, SRC3, ..., SRCn+1 receive the second clock signal CKVB through the second clock terminal CK2, and the even-numbered stages SRC2, ..., SRCn receive the first clock signal CKV through the second clock terminal CK2.

Each of the first to (n+1)-th stages SRC1 to SRCn+1 receives a start signal STV or a gate signal of a previous stage through the first input terminal IN1. In detail, the first stage SRC1 receives the start signal STV through its first input terminal IN1 to start operation of the circuit part CP, and each of the second to (n+1)-th stages SRC2 to SRCn+1 receives the gate signal from the output terminal OUT of the previous stage.

Meanwhile, each of the first to (n+1)-th stages SRC1 to SRCn+1 receives (through its second input terminal IN2) a carry signal from a next stage, i.e., a subsequent stage. The (n+1)-th stage SRCn+1 is a dummy stage to apply the carry signal to the second input terminal IN2 of the n-th stage SRCn. Since a stage does not exist after the (n+1)-th stage SRCn+1, the start signal STV is applied to the second input terminal IN2 of the (n+1)-th stage SRCn+1 instead of a carry signal.

In addition, an off voltage VSS is applied to the off voltage terminal V1 of the first to (n+1)-th stages SRC1 to SRCn+1, and an (n+1) gate signal output from the (n+1)-th stage SRCn+1 is applied to the reset terminal RE of the first to (n+1)-th stages SRC1 to SRCn+1.

The odd-numbered stages SRC1, SRC3, ..., SRCn+1 output the first clock signal CKV through the carry terminal CR and the output terminal OUT thereof, and the even-numbered stages SRC, ..., SRCn output the second clock signal CKVB through the carry terminal CR and the output terminal OUT thereof. The carry signal output from the second to (n+1)-th stage SRC2 to SRCn+1 is applied to the second input terminal IN2 of the previous stage. In addition, each of first to n-th gate signals OUT1 to OUTn that are respectively output from the first to n-th stages SRC1 to SRCn is applied to the first input terminal IN1 of the next stage.

Meanwhile, the line part LP includes first, second, third, fourth, and fifth bus signal lines SL1, SL2, SL3, SL4, and SL5.

The first bus signal line SL1 receives the off voltage VSS from an external source. The second bus signal line SL2 receives the first clock signal CKV from an external source, and the third bus signal line SL3 receives the second clock signal CKVB from an external source. The fourth bus signal line SL4 applies the start signal STV from an external source to the first input terminal IN1 of the first stage SRC1 and the second input terminal IN2 of the (n+1)-th stage SRCn+1. The fifth bus signal line SL5 applies the (n+1)-th gate signal output from the (n+1)-th stage SRCn+1 to the reset terminal RE of the first to (n+1)-th stages SRC1 to SRCn+1.

The first to fifth bus signal lines SL1 to SL5 may be disposed adjacent to the circuit part CP in the order of the fifth bus signal line SL5, the fourth bus signal line SL4, the third bus signal line SL3, the second bus signal line SL2, and the first bus signal line SL1. Also, the first bus signal line SL1 may be provided at a portion outside of the second to fifth bus signal lines SL2 to SL5 on the first base substrate 101. In general, the first to fifth bus signal lines SL1 to SL5 may be disposed in any suitable manner and order.

The line part LP may further include a first connection line CL1, a second connection line CL2, and a third connection line CL3.

The first connection line CL1 connects the first bus signal line SL1 to the off voltage terminal V1 of the first to (n+1)-th stages SRC1 to SRCn+1 of the circuit part CP. The second connection line CL2 connects the second bus signal line SL2 to the first clock terminal CK1 of the odd-numbered stages SRC1, SRC3, ..., SRCn+1 of the circuit part CP and the second clock terminal CK2 of the even-numbered stages SRC2, ..., SRCn of the circuit part CP. The third connection line CL3 connects the third bus signal line SL3 to the first clock terminal CK1 of the even-numbered stages SRC2, ..., SRCn of the circuit part CP and the second clock terminal CK2 of the odd-numbered stages SRC1, SRC3, ..., SRCn+1 of the circuit part CP.

Figure 3:
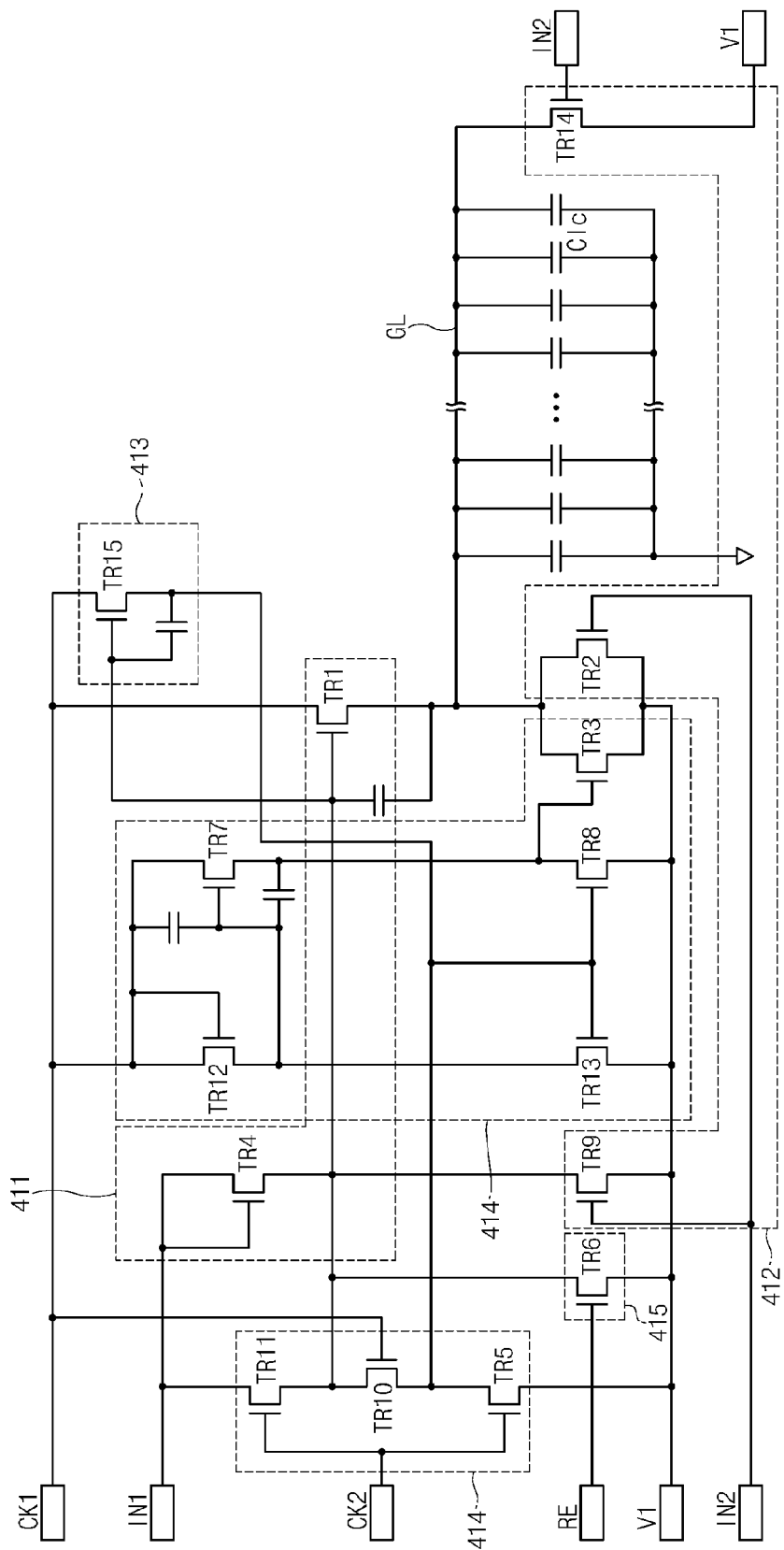
FIG. 3 is a circuit diagram of a stage of FIG. 2 according to exemplary embodiments of the present invention.

FIG. 3 is a circuit diagram showing a stage of FIG. 2.

Referring to FIG. 3, each stage includes a pull-up driving part 411, a pull-down driving part 412, a carry part 413, a ripple preventing part 414, and a frame reset part 415.

The pull-up driving part 411 includes a first transistor TR1 and a fourth transistor TR4. The first transistor TR1 includes a source electrode electrically connected to a corresponding gate line GL, a gate electrode electrically connected to a source electrode of the fourth transistor TR4, and a drain electrode to which the signal input from the first clock terminal CK1 is applied.

The fourth transistor TR4 includes a drain electrode and a gate electrode electrically connected to the drain electrode to serve as a diode. The start signal STV or the carry signal of the previous stage is applied to the drain electrode and the gate electrode of the fourth transistor TR4.

The pull-down driving part 412 includes a second transistor TR2, a ninth transistor TR9, and a fourteenth transistor TR14.

The second transistor TR2 receives the gate signal of the next stage through a gate electrode thereof and receives the off voltage VSS through a source electrode thereof. The second transistor TR2 includes a drain electrode electrically connected to the gate line GL.

The ninth transistor TR9 receives the gate signal of the next stage through a gate electrode thereof and receives the off voltage VSS through a source electrode thereof. The ninth transistor TR9 includes a drain electrode electrically connected to the gate electrode of the first transistor TR1.

The fourteenth transistor TR14 includes a source electrode to which the off voltage VSS is applied and a drain electrode electrically connected to the gate line GL. The first and second transistors TR1 and TR2 are connected to a first end of the gate line GL and the fourteenth transistor TR14 is connected to a second end of the gate line GL. The fourteenth transistor TR14 includes a gate electrode to which the gate signal of the next stage is applied.

The carry part 413 includes a fifteenth transistor TR15. The fifteenth transistor TR15 includes gate and drain electrodes respectively connected to the gate and drain electrodes of the first transistor TR1.

The carry signal output from the source electrode of the fifteenth transistor TR15 is the same as the gate signal output from the source electrode of the first transistor TR1. The fifteenth transistor TR15 includes a source electrode electrically connected to gate and drain electrodes of a fourth transistor of a next stage, and thus the carry signal is applied to the gate and drain electrodes of the fourth transistor of the next stage.

The ripple preventing part 414 includes a third transistor TR3, a fifth transistor TR5, a seventh transistor TR7, an eighth transistor TR8, a tenth transistor TR10, an eleventh transistor TR11, a twelfth transistor TR12, and a thirteenth transistor TR13.

The third transistor TR3 includes source and drain electrodes respectively connected to the drain and source electrodes of the second transistor TR2. In addition, the third transistor TR3 includes a gate electrode electrically connected to a drain electrode of the eighth transistor TR8.

The fifth transistor TR5 includes a gate electrode to which the signal input to the second clock terminal CK2 is applied, a source electrode to which the off voltage VSS is applied, and a drain electrode electrically connected to the source electrode of the fifteenth transistor TR15.

The seventh transistor TR7 includes gate and drain electrodes to which the signal input to the first clock terminal CK1 is applied and a source electrode electrically connected to the drain electrode of the eighth transistor TR8.

The eighth transistor TR8 includes a drain electrode electrically connected to the source electrode of the seventh transistor TR7 and the gate electrode of the third transistor TR3. In addition, the eighth transistor TR8 includes a source electrode to which the off voltage VSS is applied and a gate electrode electrically connected to the gate electrode of the thirteenth transistor TR13, the source electrode of the fifteenth transistor TR15, and the drain electrode of the fifth transistor TR5.

The tenth transistor TR10 includes a gate electrode to which the signal input to the first clock terminal CK1 is applied and a drain electrode electrically connected to the drain electrode of the fifth transistor TR5, the gate electrode of the eighth transistor TR8, the gate electrode of the thirteenth transistor TR13, and the source electrode of the fifteenth transistor TR15. The tenth transistor TR10 includes a source electrode electrically connected to a source electrode of the eleventh transistor TR11, the drain electrode of the sixth transistor TR6, the drain electrode of the ninth transistor TR9, the source electrode of the fourth transistor TR4, the gate electrode of the first transistor TR1, and the gate electrode of the fifteenth transistor TR15.

The eleventh transistor TR11 includes a gate electrode to which the signal input to the second clock terminal CK2 is applied. The source electrode of the eleventh transistor TR11 is electrically connected to the source electrode of the tenth transistor TR10, the drain electrode of the sixth transistor TR6, the drain electrode of the ninth transistor TR9, the gate electrode of the first transistor TR1, and the gate electrode of the fifteenth transistor TR15. In addition, the eleventh transistor TR11 includes a drain electrode to which the start signal STV or the carry signal of the previous stage is applied.

The twelfth transistor TR12 includes gate and source electrodes to which the signal input to the first clock terminal CK1 is applied and a drain electrode electrically connected to the source electrode of the thirteenth transistor TR13, the source electrode of the seventh transistor TR7, and the drain electrode of the eighth transistor TR8.

The thirteenth transistor TR13 includes the drain electrode to which the off voltage is applied, the source electrode electrically connected to the drain electrode of the twelfth transistor TR12, the source electrode of the seventh transistor TR7, and the drain electrode of the eighth transistor TR8, and the gate electrode electrically connected to the gate electrode of the eighth transistor TR8 and the source electrode of the fifteenth transistor TR15.

The frame reset part 415 includes a sixth transistor TR6. The sixth transistor TR6 includes a gate electrode to which the gate signal of the last stage is applied, a drain electrode electrically connected to the source electrode of the fourth transistor TR4 and the gate electrode of the first transistor TR1, and a source electrode to which the off voltage VSS is applied.

When the gate signal of the last stage is applied to the sixth transistor TR6, the sixth transistor TR6 is turned on, and the off voltage VSS is applied to the gate electrode of the first transistor TR1, thereby resetting all stages.

Figure 4:
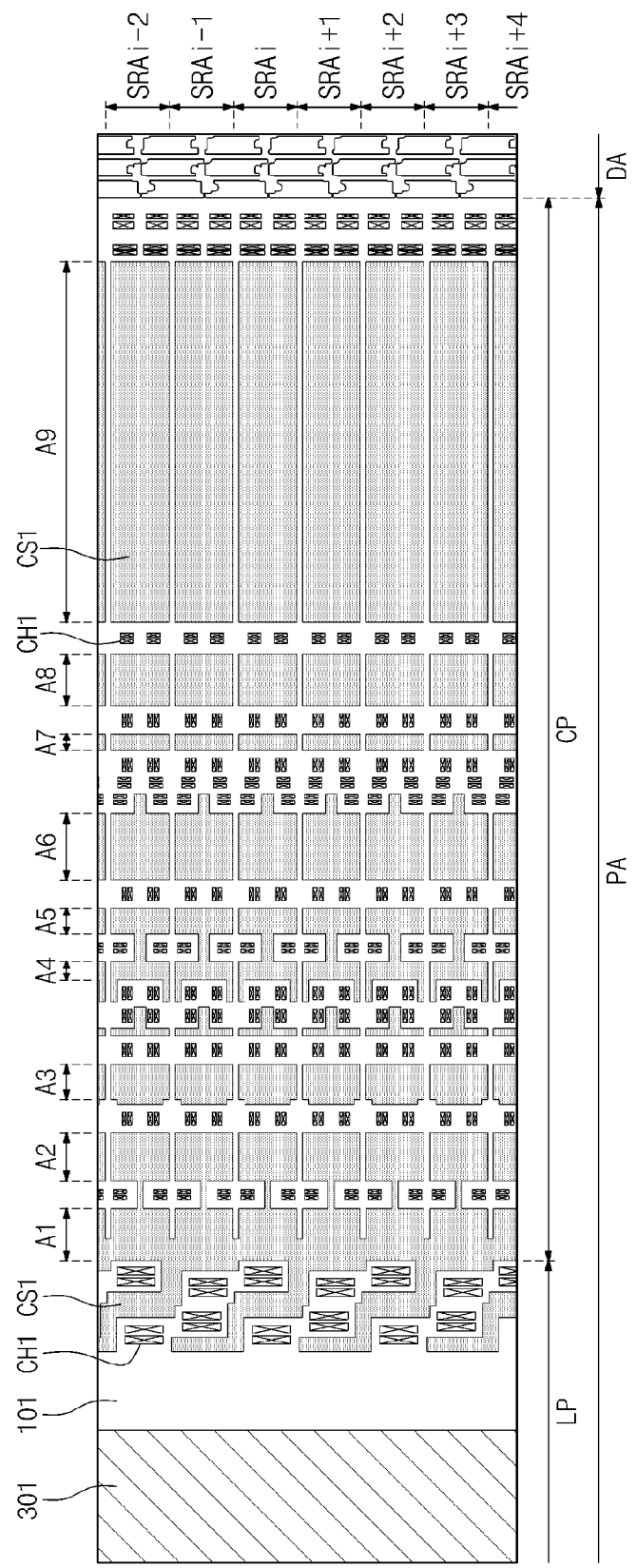
FIG. 4 is an enlarged plan view of portion "AA" of FIG. 1 according to exemplary embodiments of the present invention.

FIG. 4 is an enlarged plan view showing portion "AA" of FIG. 1. In FIG. 4, for convenience of explanation, contact holes and spacers in each stage have been shown, but transistors and signal lines connecting the transistors in each stage have been omitted.

Referring to FIG. 4, the gate driver 110 includes the circuit part CP and the line part LP.

The line part LP includes a plurality of signal lines and is provided with first contact holes CH1 to connect the signal lines to each other. As shown in FIG. 4, a portion of the line part LP may be covered by a sealant 301.

The circuit part CP includes a plurality of stages SRCi−2 to SRCi+4 and the stages SRCi−2 to SRCi+4 are arranged in stage areas SRAi−2 to SRAi+4, respectively, as shown in FIG. 4. Although not shown in FIG. 4, each of the stages SRCi−2 to SRCi+4 includes the first to fifteenth transistors TR1 to TR15.

In detail, the fourth transistor TR4 may be disposed in a first transistor area A1, and the fifth transistor TR5 may be disposed in a second transistor area A2. The sixth transistor TR6 may be disposed in a third transistor area A3, and the fifteenth transistor TR15 may be disposed in a fourth transistor area A4. The eleventh transistor TR11 may be disposed in a fifth transistor area A5, and the ninth and tenth transistors TR9 and TR10 may be disposed in a sixth transistor area A6. The twelfth and thirteenth transistors TR12 and TR13 may be disposed in a seventh transistor area A7, and the seventh and eighth transistors TR7 and TR8 may be disposed in an eighth transistor area A8. The first to third transistor TR1, TR2, and TR3 may be disposed in a ninth transistor area A9.

Although not shown in FIG. 4, a plurality of signal lines is arranged in the circuit part CP to connect the first to thirteenth transistors TR1 to TR13 and the fifteenth transistor TR15. In addition, the circuit part CP is provided with first contact holes CH1 to connect the signal lines to each other. In addition, the fourteenth transistor TR14 may be disposed in the peripheral area at the right side of the display area DA.

The arrangements of the first, second, third, fourth, fifth, sixth, seventh, eighth, ninth, tenth, eleventh, twelfth, thirteenth, fourteenth, and fifteenth transistors TR1, TR2, TR3, TR4, TR5, TR6, TR7, TR8, TR9, TR10, TR11, TR12, TR13, TR14, and TR15 may be varied from the configuration of locations described above. In general, various configurations and arrangements can be employed to dispose transistors and signal lines.

As shown in FIG. 4, first column spacers CS1 are disposed between the first and second substrates 101 and 201 corresponding to the peripheral area PA to maintain a distance between the first and second substrates 101 and 201. When viewed in a plan view, the first column spacers CS1 are positioned in an area except for the area in which the first contact holes CH1 are formed.

Particularly, the first column spacers CS1 may be disposed on the first to fifteenth transistors TR1 to TR15 and the first to fifth bus signal lines SL1 to SL5 except for the area in which the first contact holes CH1 are formed.

The first column spacers CS1 may be integrally formed with each other while being disposed at their positions, and each of the first column spacers CS1 may be divided into plural numbers while being disposed in their positions.

In addition, the arrangements of the first column spacers CS1 may be varied from the configuration shown in FIG. 4. For instance, column spacers disposed in two adjacent stages may be connected to each other.

Detailed descriptions of the first column spacers CS1 will be described with reference to FIGS. 5 and 6.

Figure 5:
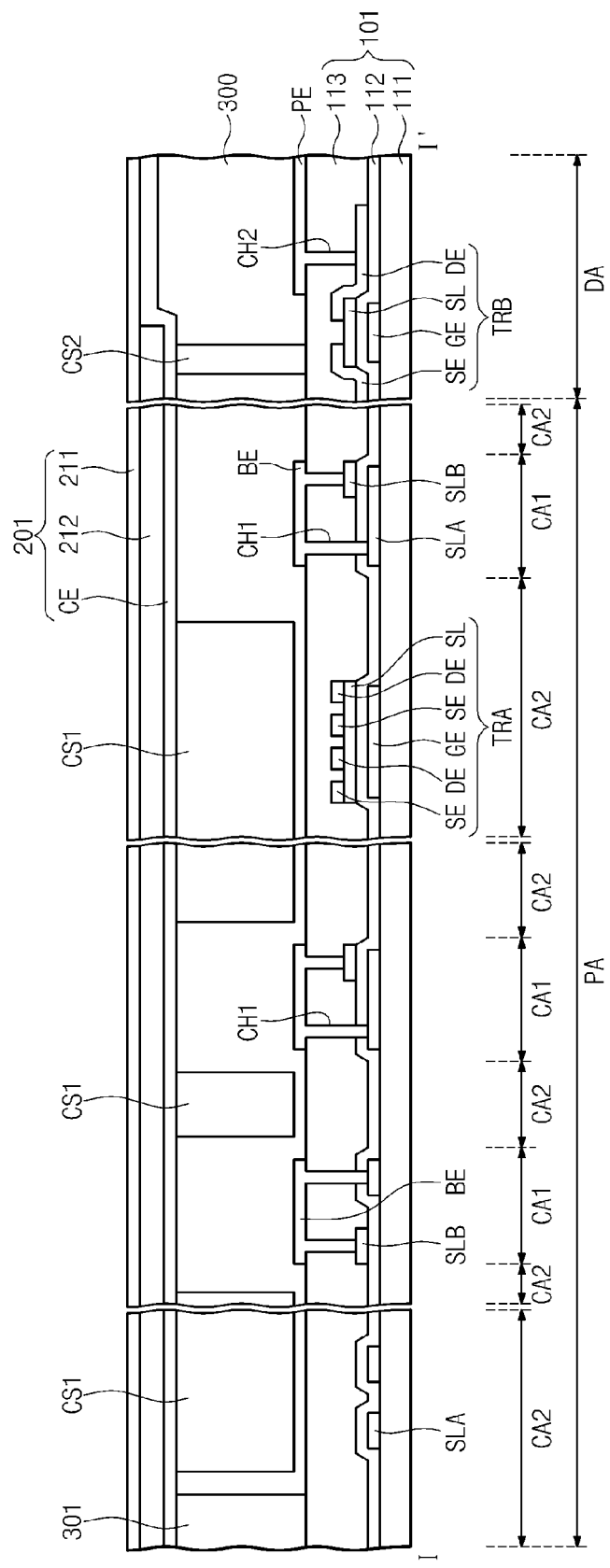
FIG. 5 is a cross-sectional view taken along line I-I' of the display apparatus of FIG. 1 according to exemplary embodiments of the invention.

FIG. 5 is a cross-sectional view showing an exemplary embodiment of a display apparatus taken along line I-I' of FIG. 1. For convenience of explanation, a portion of the display panel has been shown in FIG. 5.

Referring to FIG. 5, the first substrate 101 includes a first base substrate 111, a gate electrode GE disposed on the first base substrate 111, and a first signal line SLA. The gate electrode GE connects to the first signal line SLA.

A gate insulating layer 112 is disposed on the first base substrate 111 to cover the gate electrode GE and the first signal line SLA. A source electrode SE, a drain electrode DE, and a second signal line SLB are disposed on the gate insulating layer 112. The second signal line SLB may be formed through the same process as the source electrode SE and the drain electrode DE and may include the same material as the source electrode SE and the drain electrode DE. The first to fourth bus signal lines SL1, SL2, SL3, and SL4 may be one of the first signal line SLA or the second signal line SLB.

A semiconductor layer SL may be further disposed between the source electrode SE and the gate electrode GE and between the drain electrode DE and the gate electrode GE.

A protective layer 113 may be further disposed on the source electrode SE, the drain electrode DE, and the second signal line SLB. The protective layer 113 may be formed of an organic or inorganic material.

The second signal line SLB is covered by the protective layer 113, and the first signal line SLA is covered by the gate insulating layer 112 and the protective layer 113.

The protective layer 113 may be provided with contact holes formed therethrough to expose a portion of the source electrode SE and the drain electrode DE.

In the present exemplary embodiment, the contact hole connected to a portion of the first and second signal lines SLA and SLB in the peripheral area PA is referred to as a first contact hole CH1, and a contact hole connected to a portion of the drain electrode DE in the display area DA is referred to as a second contact hole CH2.

As shown in FIG. 5, a bridge electrode BE is disposed on the first contact hole CH1 corresponding to each of the first and second signal lines SLA and SLB to connect the first and second signal lines SLA and SLB. In addition, a pixel electrode PE is disposed on the protective layer 113, and the pixel electrode PE is connected to the drain electrode DE through the second contact hole CH2 to expose the portion of the drain electrode DE. Thus, the pixel electrode PE may receive the signal output from the drain electrode DE.

The bridge electrode BE may be formed using the same or similar process used to form the pixel electrode PE and may include the same material as the pixel electrode PE.

The first substrate 101 includes a first thin film transistor TRA arranged in the peripheral area PA and a second thin film transistor TRB arranged in the display area DA.

The first thin film transistor TRA may be one of transistors of the stage included in the gate driver 110. The second thin film transistor TRB includes a gate electrode GE connected to a corresponding gate line, a source electrode SE connected to a corresponding data line to receive a source signal, and a drain electrode DE connected to a corresponding data line to receive a data signal. Thus the second thin film transistor TRB may output the data voltage through the drain electrode thereof at a predetermined timing.

The semiconductor layer SL included in the first thin film transistor TRA may include the same material as the second thin film transistor TRB.

The second substrate 201 includes a second base substrate 211 and a black matrix 212.

The second base substrate 211 may be a transparent glass material. The black matrix 212 may be formed of a light blocking material and disposed in the peripheral area PA. In addition, the black matrix 212 may be further formed in an area, e.g., a non-effective area in which the pixel electrode PE does not exist, of the display area DA. The black matrix 212 may include a metal material such as chromium (Cr).

As shown in FIG. 5, the second substrate 201 may further include a common electrode CE disposed on the second base substrate 211 and the black matrix 212 and formed of a transparent conductive material.

Meanwhile, a sealant 301 is disposed between the first and second substrates 101 and 201, and the first and second substrates 101 and 201 are coupled to each other by the sealant 301 through a heat pressing process. Particularly, the sealant 301 may be formed on the portion of the gate driver 110 to cover a portion of the gate driver 110.

Then, when a liquid crystal material is injected into between the first and second substrates 101 and 201, the liquid crystal layer 300 is formed between the first and second substrates 101 and 201. In addition, the sealant 301 may reduce a parasitic capacitance generated between the gate driver 110 and the common electrode CE.

The display apparatus 100 further includes the first column spacer CS1 disposed in the peripheral area PA and the second column spacer CS2 disposed in the display area DA to maintain the distance between the first and second substrates 101 and 201.

The first column spacer CS1 is disposed in a non-contact area CA2 in which the first contact CH1 does not exist. This is because a portion surrounding a contact area CA1 may be corroded when the first column spacer CS1 is formed in the contact hole area CA1 in which the first contact hole CH1 exists, which may possibly cause a malfunction of the display apparatus 100.

Meanwhile, the second column spacer CS2 is disposed in the non-effective area of the display area DA.

In some cases, the first column spacer CS1 may have a lower height than the height of the second column spacer CS2. The difference in height between the first and second column spacers CS1 and CS2 may be adjusted by controlling the open area size of the mask used to form the first and second column spacers CS1 and CS2. In general, the first column spacer CS1 and the second column spacer CS2 may have any suitable height.

In addition, the first column spacer CS1 may be spaced apart from the protective layer 113 such that the first column spacer CS1 does not contact the protective layer 113, but other exemplary embodiments may not be limited thereto. That is, in some cases, the first column spacer CS1 may contact the protective layer 113.

Referring to FIG. 4, the first column spacer CS1 may be extended along the non-contact area of an adjacent stage so that the first column spacer CS1 may have a stripe shape.

Figure 6:
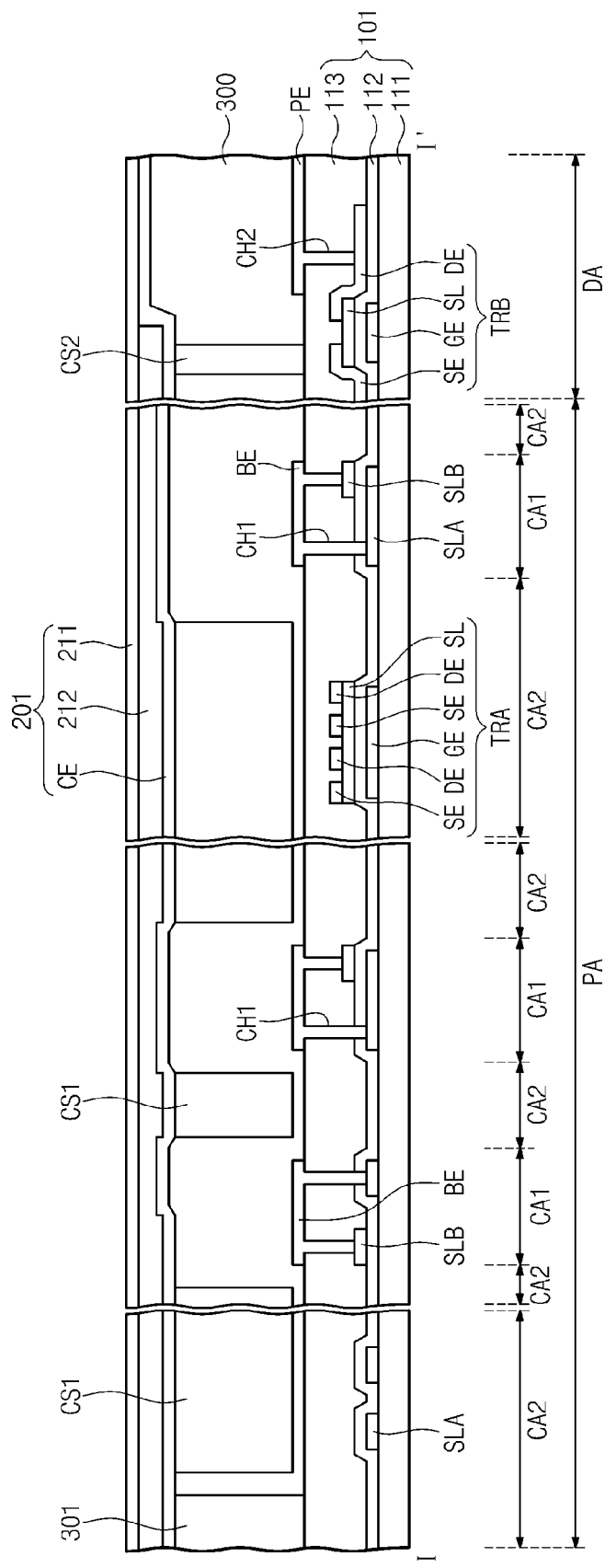
FIG. 6 is a cross-sectional view taken along line I-I' of the display apparatus of FIG. 1 according to exemplary embodiments of the invention.

FIG. 6 is a cross-sectional view showing another exemplary embodiment of a display apparatus taken along line I-I' of FIG. 1. In FIG. 6, the same reference numerals denote the same elements in FIG. 5 so descriptions of the same elements may not be repeated.

Referring to FIG. 6, the black matrix 212 disposed in the peripheral area PA has different thicknesses according to its position. Particularly, the black matrix 212 disposed in the contact area CA1 has a thinner thickness than a thickness of the black matrix 212 in the non-contact area CA2. In more detail, the ratio of the thickness of the black matrix 212 disposed in the contact area CA1 to the thickness of the black matrix 212 disposed in the non-contact area CA2 may be 0.8 or less. The ratio of the thickness of the black matrix 212 disposed in the contact area CA1 to the thickness of the black matrix 212 disposed in the non-contact area CA2 is not limited thereto and may be set to any desirable ratio.

The thickness of the black matrix 212 disposed in the peripheral area PA may be adjusted by the position of the first column spacer CS1. In detail, the black matrix 212 disposed in the area in which the first column spacer CS1 does not exist may have a thinner thickness than a thickness of the black matrix 212 disposed in the area in which the first column spacer CS1 exists.

In addition, the thickness of the black matrix 212 may be adjusted by using a half-tone mask or a slit mask used to form the black matrix 212.

Since the bridge electrode BE is disposed in the contact area CA1, the parasitic capacitance may increase between the bridge electrode BE and the common electrode CE. Accordingly, when the thickness of the black matrix 212 disposed in the contact area CA1 is reduced, the parasitic capacitance may be reduced since the distance between the common electrode CE and the bridge electrode BE is increased. Thus, the thickness of the black matrix 212 may be adjusted, thereby preventing the display apparatus 100 from having a malfunction.

An example related to the display apparatus shown in FIG. 6 is described below.

A display apparatus may have a cell gap, i.e., the distance between the first and second base substrates 111 and 211, of about 3.2 μm, and the distance between the common electrode CE and the bridge electrode BE may be 0.4 μm. Meanwhile, the black matrix 212 may have a thickness of about 1.4 μm in the non-contact area CA2, and the black matrix in the contact area CA1 may have a thickness of about 1.0 μm. Therefore, the distance between the common electrode CE and the bridge electrode BE is about 0.8 μm in the contact area CA1. Since capacitance is inversely proportional to the distance between the common electrode CE and the bridge electrode BE, the parasitic capacitance may be reduced by approximately half when the distance between the common electrode CE and the bridge electrode BE is approximately doubled.

In FIG. 5 and FIG. 6, the column spacers CS1 and CS2 have been shown as spacers used to maintain the distance between the first and second substrates 101 and 201, but the spacers are not limited to column spacers. That is, a bead spacer may be used instead of the column spacers.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display apparatus, comprising:
   a first substrate comprising:
      a display area comprising a plurality of pixels to display an image; and
      a peripheral area comprising a driving circuit to drive the pixels;
   a second substrate facing the first substrate;
   a liquid crystal layer disposed between the first substrate and the second substrate;
   a first spacer disposed in the peripheral area to maintain a distance between the first substrate and the second substrate; and
   a second spacer disposed in the display area to maintain the distance between the first substrate and the second substrate,
   wherein the driving circuit comprises:
      a first signal line;
      a second signal line insulated from the first signal line;
      a first protective layer disposed on the first signal line and the second signal line, the first protective layer comprising a first contact hole to expose a portion of the first signal line and a portion of the second signal line; and
      a bridge electrode disposed on the first protective layer to connect the first signal line and the second signal line through the first contact hole, and
   wherein the peripheral area further comprises:
      a contact area disposed in an area corresponding to the first contact hole; and
      a non-contact area disposed in an area corresponding to the first spacer.

2. The display apparatus of claim 1, wherein the second substrate comprises:
   a substrate; and
   a black matrix disposed on the substrate.

3. The display apparatus of claim 2, wherein the black matrix comprises:
   a first area corresponding to the contact area; and
   a second area corresponding to the non-contact area,
   wherein a thickness of the black matrix in the first area is thinner than a thickness of the black matrix in the second area.

4. The display apparatus of claim 3, wherein a ratio of thickness of the black matrix in the first area to the thickness of the black matrix in the second area is less than or equal to 0.8.

5. The display apparatus of claim 2, wherein the black matrix comprises:
   a first area in which the first spacer is disposed; and
   a second area in which the first spacer is not disposed,
   wherein a thickness of the black matrix in the second area is thinner than a thickness of the black matrix in the first area.

6. The display apparatus of claim 2, wherein the second substrate further comprises a common electrode disposed on the black matrix, and the first spacer and the second spacer are disposed on the common electrode.

7. The display apparatus of claim 6, wherein a distance between the first protective layer and the common electrode in the contact area is different from a distance between the first protective layer and the common electrode in the non-contact area, and the distance between the first protective layer and the common electrode in the contact area depends on a thickness of the black matrix in the contact area.

8. The display apparatus of claim 1, wherein the pixel comprises:
- a gate line arranged in a first direction;
- a data line arranged in a second direction different from the first direction and crossing the gate line, the data line being insulated from the gate line;
- a first switching device connected to the gate line and the data line and comprising a first semiconductor layer;
- a second protective layer disposed on the first switching device and comprising a second contact hole to expose a portion of the first switching device; and
- a pixel electrode disposed on the second protective layer and connected to the first switching device through the second contact hole.

9. The display apparatus of claim 8, wherein the driving circuit further comprises a gate driver to apply a gate signal to the gate line, and the gate driver is disposed on the first substrate by a thin film process used to dispose the pixels.

10. The display apparatus of claim 9, wherein the gate driver comprises a second switching device connected to the first signal line and the second signal line, and the first spacer is disposed on the second switching device in an area corresponding to the non-contact area between two first contact holes that are adjacent to each other.

11. The display apparatus of claim 8, wherein the driving circuit further comprises a second switching device connected to the first signal line and the second signal line, the second switching device comprising a second semiconductor layer comprising the same material as the first semiconductor layer.

12. The display apparatus of claim 8, wherein the first protective layer comprises the same material as the second protective layer.

13. The display apparatus of claim 8, wherein the bridge electrode comprises the same material as the pixel electrode.

14. The display apparatus of claim 8, wherein the first signal line comprises the same material as the gate line, and the second signal line comprises the same material as the data line.

15. The display apparatus of claim 1, further comprising a member disposed between the first substrate and the second substrate to couple the first substrate to the second substrate, wherein the member covers at least a portion of the driving circuit.

16. The display apparatus of claim 1, wherein each of the first spacer and the second spacer is a column spacer.

17. The display apparatus of claim 16, wherein the first spacer has a height less than a height of the second spacer.

18. The display apparatus of claim 1, wherein the first spacer is spaced apart from the first protective layer.

19. The display apparatus of claim 1, wherein the driving circuit further comprises a gate driver comprising a plurality of stages, and the first spacer is disposed corresponding to a non-contact area between two first contact holes that are adjacent to each other.

20. The display apparatus of claim 19, wherein at least one of the plurality of stages comprises a switching device connected to the first signal line and the second signal line, and the first spacer is disposed on the first switching device.

21. An apparatus, comprising:
- a first substrate;
- a second substrate facing the first substrate;
- a first spacer arranged in a peripheral area of the first substrate to maintain a distance between the first substrate and the second substrate; and
- a second spacer arranged in a display area of the first substrate to maintain a distance between the first substrate and the second substrate,
- wherein the peripheral area further comprises:
  - a non-contact area corresponding to the first spacer; and
  - a contact area comprising a contact hole, and
- wherein at least one dimension of the first spacer is less than at least one dimension of the second spacer.

22. The apparatus of claim 21, further comprising:
- a common electrode disposed on the second substrate;
- a protective layer disposed on the first substrate,
- wherein a distance from the protective layer to the common electrode corresponding to the contact area is greater than a distance from the protective layer to the common electrode corresponding to the non-contact area.

* * * * *